ARRANGEMENT FOR DISTRIBUTING AND DEMODULATING IMPULSES

Filed May 20, 1955 3 Sheets-Sheet 1

Inventors.
Herbert Holzwarth, & Walter Arens.
By. [signature] Atty.

Inventors.
Herbert Holzwarth, &
Walter Arens.
By [signature] Atty.

Dec. 15, 1959 H. HOLZWARTH ET AL 2,917,584

ARRANGEMENT FOR DISTRIBUTING AND DEMODULATING IMPULSES

Filed May 20, 1955 3 Sheets-Sheet 3

Inventors.
Herbert Holzwarth, &
Walter Arens.

By. Atty.

United States Patent Office 2,917,584
Patented Dec. 15, 1959

2,917,584

ARRANGEMENT FOR DISTRIBUTING AND DEMODULATING IMPULSES

Herbert Holzwarth and Walter Arens, Munich, Germany, assignors to Siemens and Halske Aktiengesellschaft, Munich and Berlin, Germany, a corporation of Germany Application May 20, 1955, Serial No. 509,946
In Germany February 16, 1950

Public Law 619, August 23, 1954
Patent expires February 16, 1970

7 Claims. (Cl. 179—15)

This invention is concerned with an arrangement for distribution of pulses belonging to different transmission channels, to the several channels and their simultaneous demodulation.

Lines for transmission of intelligence use modulated pulses by which a high-frequency carrier, usually of a wavelength within UHF and SHF range, is modulated. In order to use one connection for several messages, the pulses generated by diverse channels are relatively displaced in time so that the time interval between two pulses originated by a given channel is used for the pulses of other channels. If the pulses of the individual channels have a repetition frequency of, for example, 8 kilocycles, then the sequence frequency of pulses during transmission of 12 messages is 12 times larger, that is, 96 kc. The 1st, 13th, 25th, 37th etc. pulse belongs to the first, the 2nd, 14th, 26th, 38th etc. pulse to the second channel, etc. In the following, the time staggered interlacing of the various individual pulses in the transmission (in the example, the 96 kc. sequence) is designated "pulse series" while "pulses" means pulses belonging to an individual channel, in the present example the 8 kc. repetition frequency.

In the receiver, the individual pulses must be resolved from the pulse series and channeled into their respective channels. Arrangements which simultaneously do this distribution to the diverse chanels and also demodulate, have already been proposed. They deliver an audio-frequency output which may, through an amplifier, be fed into a reproducing device, for example, a telephone.

For this purpose, it is useful to have the input pulses in amplitude-modulated form. However, in the transmission line one uses preferentially phase- or length-modulated pulses because these are less susceptible to disturbance than the amplitude-modulated ones. Hence, a conversion of the pulses into amplitude-modulated ones must be provided. Such conversion devices have also been already proposed. Finally, in order to seize the time-displaced pulses at the proper time and to feed them into the proper channel, a timing pulse is required, which may not be phase-modulated but should be amplitude modulated or length-modulated so that at least one of its flanks repeats at always equal intervals.

The invention is concerned with an arrangement for the distribution of the pulses to the diverse channels and for their simultaneous demodulation. In the arrangement according to the invention, a demodulator is provided for each channel into which are fed, first, all received pulses, which are originally phase modulated but have been transformed into amplitude modulated ones; second, a sine voltage, phase-displaced with respect to the voltages provided for the other demodulators, with a frequency a subharmonic of the pulse series frequency, obtained by a frequency divider from a pulse coupled in-phase with the timing pulse of the received pulses (auxiliary pulse); and third, this pulse (auxiliary pulse) itself, all signals being superposed.

For the production of the sine votages fed into the diverse demodulators, which have phase differences among each other, a frequency divider is provided as a further feature of the invention. It delivers, in addition to the fundamental sine voltage, for the various sine voltages obtained from it through phase shifts, a rectangular voltage of equal frequency, the zero passages (reversals) of which are used for synchronization of the pulse voltage fed into the frequency divider with the timing pulse of the pulse series. Furthermore, for synchronization, a device is provided which selects the timing pulse from the pulse series and in which a direct current voltage is produced, the polarity and magnitude of which depend on the distance between the timing pulse and the zeros of the rectangular voltage. Hence, the direct current voltage output of this timing pulse gate is positive or negative if the timing pulse occurs earlier or later than one flank of the rectangular signal and of a magnitude increasing with increasing time difference between these operations. If the center of the timing pulse coincides with the zero passages of the rectangular signal, then this voltage is zero. It is used in a reactance tube which is in parallel with a frequency-controlling oscillator circuit of the generator which furnishes the input voltage to the frequency divider. In case of a phase difference appearing, that is, when a positive or negative voltage is produced, the generator is accordingly adjusted. This secures the equality of phase between the pulses and oscillations in the receiver and the timing pulse of the received pulse series.

The generator, adjusted to deliver the auxiliary pulses, produces suitably two pulses differing in phase by 180° with one-half the repetition frequency of the received pulse series which are separated by gate circuits. They are separately fed into the demodulators which are divided into two groups. The first group may, for example, contain the odd-numbered channels, the second the even-numbered ones, inserted between the former. A pulse directed to the first channel and hence fed into the first demodulator of the first group, is presently followed by a pulse for the second channel which must be fed into the first demodulator of the second group; then by a pulse for the third channel which is fed into the second demodulator of the first group, etc. This avoids feeding pulses into the various demodulators which are, in time, too close to the pulses that are to demodulate.

Since the conversion of phase-modulated pulses into amplitude-modulated ones may necessitate auxiliary pulses of a frequency equal to that of the received pulse series, the two pulses produced by the generator may be connected in parallel and fed into the pulse converter. The repetition frequency of the pulses so produced is equal to the repeat frequency of the received pulse series.

The various objects and features of the invention will now be described with reference to the accompanying diagrammatic drawings, wherein Fig. 1 shows an example of an arrangement according to the invention;

Figures 1, 6:
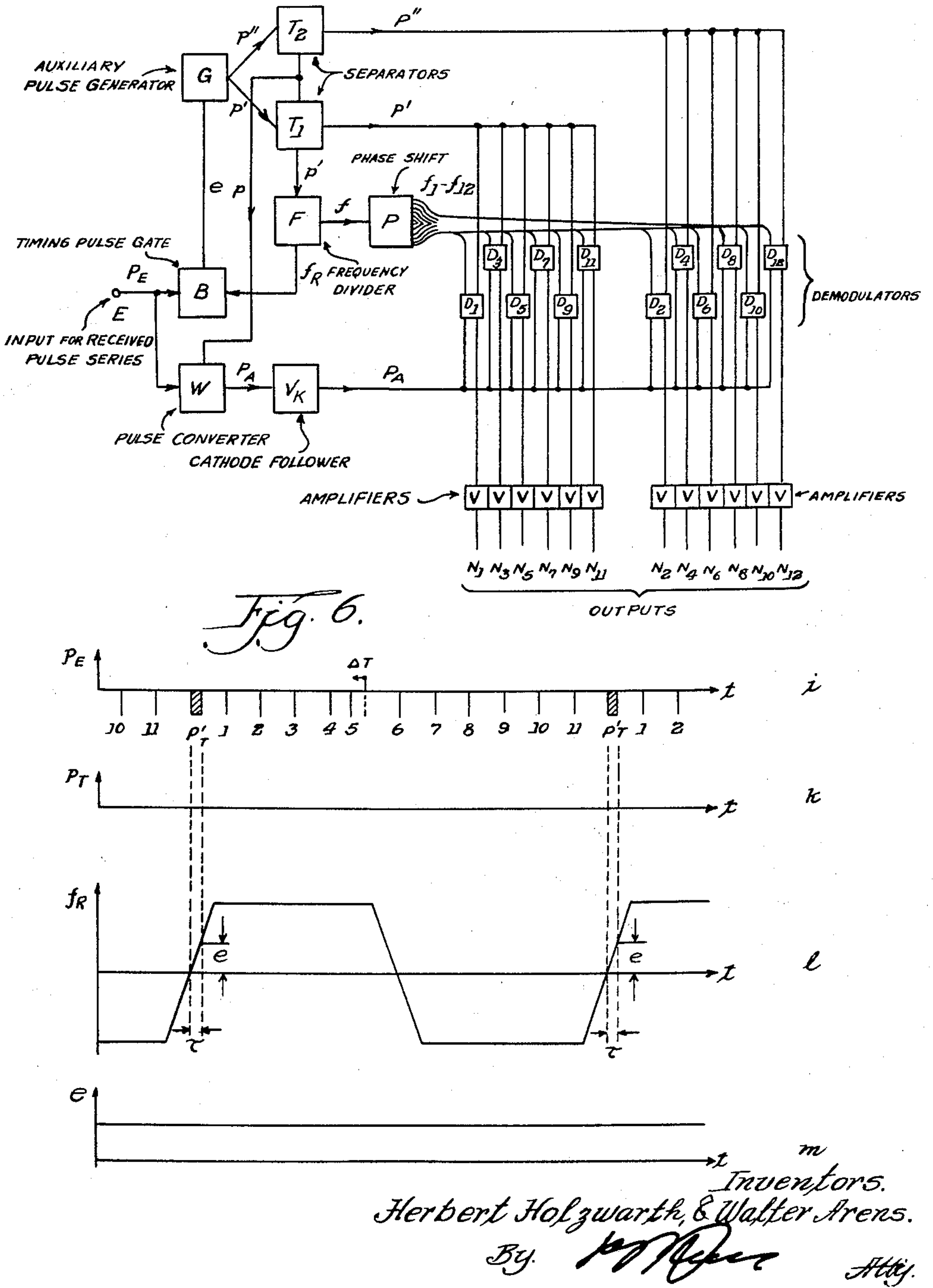
Figs. 5 and 6 illustrate the various wave forms involved at the corresponding points indicated in the other figures.

Referring now to Fig. 1, the received pulse series is fed in at E and arrives at the timing pulse gate B and at the pulse converter W. The auxiliary pulses are produced in the generator G and are fed, in the form of two pulses $p'$ and $p''$, differing by 180° in phase, to the separators $T_1$ and $T_2$. The separator $T_1$ also feeds the frequency divider F which, in turn, feeds the sine voltage of frequency $f$ to the phase shifter P, and feeds a rectangular signal of equal frequency $f$ ($f_R$) to the timing pulse gate B, which delivers the adjusting (correcting) voltage $e$ to the generator G. The demodulators for the several channels (in the example, 12 channels are assumed) are divided into two groups, the first containing the demodulators D1, D3, D5, D7, D9 and D11, the second the demodulators D2, D4, D6, D8, D10 and D12.

The pulses of the received pulse series ($P_A$), transformed into amplitude modulated pulses, are fed from the pulse converter W through a cathode follower VK into the first group which also receives from the separator $T_1$ the partial auxiliary pulses $p'$ and, from the phase shift P, the sine voltages $f1$, $f3$, $f5$, $f7$, $f9$ and $f11$. The demodulators of the second group receive also $P_A$, and, from the separator $T_2$, the second part of the auxiliary pulses $p''$, and, from the phase shifter P, the sine voltages $f2$, $f4$, $f6$, $f8$, $f12$. The demodulated low-frequency signals are fed, through the channel amplifier V, to the outputs N1 to N12.

As noted before, Figs. 2 to 4 show details of the arrangement according to Fig. 1. These details, as such, do not represent features of the invention, they should rather be considered as examples of realization of the individual parts of the arrangement according to the invention, and they may also have other forms.

Figure 2:
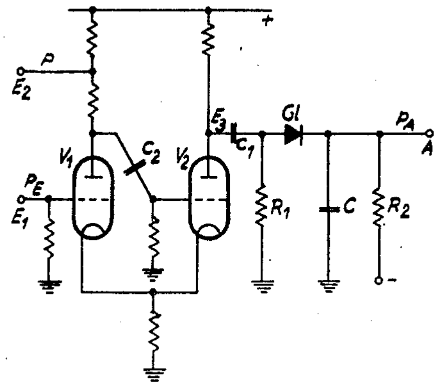
Fig. 2 is a diagrammatic figure of one form of auxiliary pulse generator G which may be employed.

In Fig. 2, the pulse converter of Fig. 1 is represented in principle. The arrangement shown changes phase modulated pulses into amplitude modulated ones, whereby intermediately length-modulated pulses are generated. The received pulses of the pulse series $P_E$ are fed at $E_1$ to the grid of tube V1, which works in a multivibrator arrangement with tube V2.

The pulses $p$, rigidly in phase, which are drawn from the pulse generator G, are fed in at $E_2$. A pulse arriving at $E_1$ switches the multivibrator in one direction, a pulse arriving at $E_2$ in the other direction. Since the pulses $p$ are rigidly in phase, while the pulses $P_E$ are phase modulated, the output $E_3$ of the multivibrator shows voltage pulses of diverse lengths according to the time of arrival of the pulse belonging to the pulse series $P_E$. The length-modulated pulses are fed from $E_3$ through a capacitor $C_1$, to an arrangement comprising a rectifier G1, two resistors $R_1$ and $R_2$ and a capacitor C. The resistors are so designed that the current flowing through the rectifier G1 is substantially determined by the resistor $R_2$ while the impedance of the tube is practically unimportant. The rectifier G1 is blocked by the length-modulated pulses fed in at $E_3$, for the duration of the pulse. During this time, then, the capacitor C is charged up to a voltage which is proportional to the length of the pulse, provided that the capacitance C is large enough. At the end of the pulse, the blocking of the rectifier is terminated and the capacitor C discharges very rapidly through the small impedance of the rectifier and through the resistor $R_1$ which is small as compared to $R_2$. The signal from the capacitor C so obtained, an amplitude modulated pulse, is delivered at A.

Figure 3:
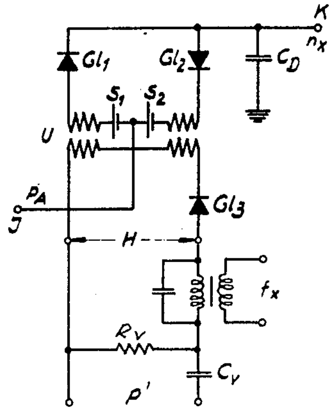
Fig. 3 is a diagrammatic figure of one form of demodulator $D_1$ through $D_{12}$ which may be employed.

Fig. 3 shows a demodulator arrangement as indicated at $D_1$, $D_2$, etc. in Fig. 1. The amplitude modulated pulses, that is, all pulses of the whole pulse series, are fed, at J, to the center tap of a transformer U. The direct current sources $S_1$ and $S_2$ are provided for the bias of the rectifiers $G1_1$ and $G1_2$, but they may be replaced by a combination of capacitors and resistors for automatic production of the bias voltage. At H, one of the partial pulses produced in the generator G (Fig. 1) is fed in, and also one of the sine voltages $f_x$ issued from the phase shift P. The arrangement works as follows: The bias produced by $S_1$ and $S_2$ blocks the rectifiers $G1_1$ and $G1_2$ until the total voltage at H is such that only that part of the pulses $p'$ comes through the rectifier $G1_3$ to the transformer U, which is determined by the frequency dividing proportion, and that on the secondary circuit the rectifier arrangement $G1_1$, $G1_2$ is opened for the duration of these pulses. Furthermore, the capacitor $C_V$ obtains a direct current voltage which may be adjusted by $R_V$ and which is made so large that only the pulse positioned on the crest of a sine wave arrives at U through the rectifier $G1_3$. During this time, a pulse fed in at J can pass through the rectifier arrangement and can charge the capacitor $C_D$. The signals $f_x$ issued from the phase shifter P and the pulses $p'$ superposed on this signal have the effect that the blocking bias of the rectifiers $G1_1$ and $G1_2$ is only overcome when a pulse which is intended for the channel of the particular demodulator, is fed in at J. The capacitor $C_D$ is made so large that it maintains its charge approximately constant until the arrival of the next pulse. Its voltage is taken off at K and is fed to a channel amplifier V.

Figure 4:
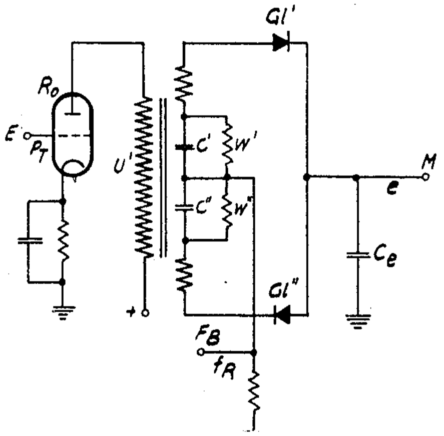
Fig. 4 is a diagrammatic figure of one form of timing pulse gate B which may be employed.

Fig. 4 shows an arrangement for rigid phase-coupling of the generator G (Fig. 1) with the timing pulse $P_T$ of the pulse series $P_E$. It comprises a tube R$o$ for amplification of the timing pulse $P_T$ arriving at E, a transformer U′, the rectifiers G1′ and G1″ and the capacitors C′ and C″, to which resistors W′ and W″ are connected in parallel, and also a capacitor $C_e$ from which the voltage $e$ is obtained at M. The rectangular signal $f_R$ coming from the separator $T_1$ and the frequency divider F of Fig. 1, is fed in at $F_B$ and passed to the center tap of the secondary winding of the transformer U′. The arrangement works as follows:

The timing pulse arriving from the tube R$o$ at the transformer opens the rectifier arrangement G1′ and G1″ for the duration of one timing pulse. During this time the voltage $f_R$ can pass, with its instantaneous value, through the rectifier arrangement to the capacitor $C_e$. Hence, if a timing pulse appears at that instant when one flank of the voltage $f_R$ obtains, no voltage arrives at the capacitor $C_e$. If the flank of $f_R$ appears sooner or later, positive or negative voltage pulses arrive at the capacitor $C_e$, which may be taken off as voltage $e$ at M. They are then fed to a frequency-controlling component of the generator G (Fig. 1) which changes the frequency $f_R$ until the flanks of this voltage again coincide with the center of the timing pulses $P_T$. Preferentially, one uses as adjusting component an arrangement (known as such) with a reactance tube which may be coupled to the frequency-controlling oscillator circuit of the generator G, through a transformer.

Figure 5:
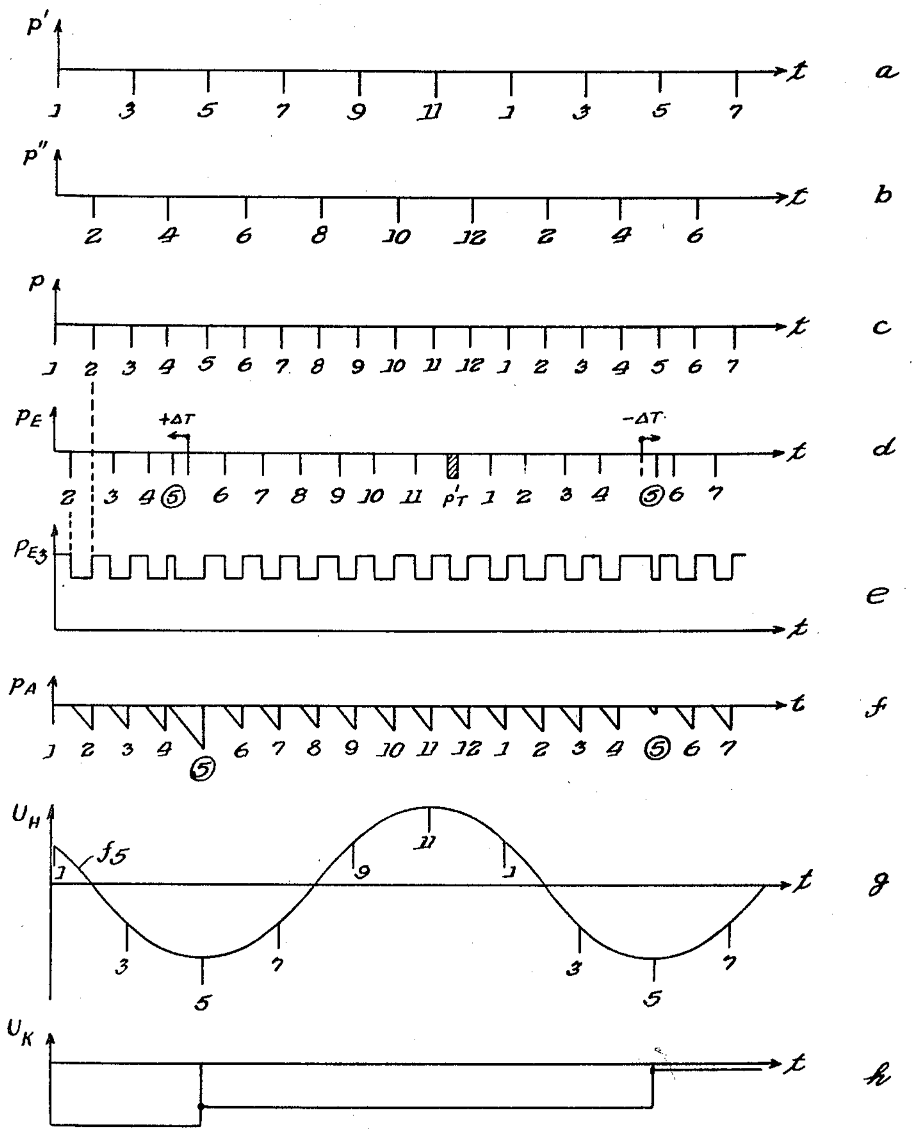

As an aid in visualizing the various wave forms and their relationships heretofor described, Figs. 5 and 6 illustrate the wave forms at the various points correspondingly designated in the other figures.

Referring to Fig. 5, this figure illustrates:

Line $a$: The auxiliary pulses $p'$, which are allotted to the odd numbered channels 1, 3, 5, 7, 9, 11. In case of a scanning frequency (sampling frequency) of 8 kilocycles, corresponding to the impulse repetition frequency for a single channel or to the distributor frequency, the impulse sequence frequency $p'$ will be 6·8 kilocycles=48 kilocycles.

Line $b$: The auxiliary impulse sequence $p''$ allotted to the even numbered channels 2, 4, 6, 8, 10, 12, the impulse sequence frequency of which corresponds likewise to 48 kilocycles. The auxiliary impulse sequences $p'$ and $p''$ are mutually phase shifted by 180°.

Line $c$: The auxiliary impulse sequence $p$ which is produced by addition of the auxiliary impulse sequences $p'$ and $p''$. The impulse sequence frequency 96 kilocycles is required for the control of the impulse converter W.

Line $d$: The impulse sequence $p_E$ arriving in Fig. 1 at E. It is assumed that all channels excepting channel 5 indicated by a circle are unmodulated. The normal position for the channel impulse 5 as indicated in dotted lines; the time displacement is indicated by $\pm\Delta T$. The 12th impulse (cross hatched) serves as timing pulse $p_T'$.

Line $e$: The square impulses $p_{E_3}$ at the output $E_3$ of the multivibrator in the impulse converter W (Fig. 2); they are longitudinally modulated (see channel 5).

Line $f$: The sawtooth impulses $p_A$ at the output A of the impulse converter W (Fig. 2); they are amplitude modulated.

Line $g$: Voltage $U_H$ between the terminals H of the demodulator $D_5$ (Fig. 3) which is allotted to the 5th channel; such voltage being produced by superimposition of the sine wave $f_5$ delivered by the phase shifter P and the auxiliary impulse sequence $p'$. The frequency of the sine oscillation corresponds to the scanning and distributor frequency=8 kilocycles. The rectifiers $Gl_3$ and $Gl_1$, $Gl_2$ are made conductive only by the impulse 5 upon the crest of the sine oscillation; during this time, capacitor $C_D$ will be charged to the momentary voltage of $P_A$ (voltage $U_K$, see line $h$), which is supplied at J. Of the 12 sine voltages $f_1$ to $f_{12}$, delivered by the phase shifter P, which are mutually phase shifted by 30°, only the oscillation $f_5$ is shown for convenience and clarity.

Line $h$: The stepped voltage $U_K$ occurring at the output K of the demodulator.

Referring to Fig. 6, this figure illustrates:

Line $i$: The impulse sequence $p_E$ arriving at E (Fig. 1) with the timing pulse $p_T$, (corresponding to Fig. 5, line $d$). The timing pulse distinguishes from the channel pulse by greater duration. Its rear flank may recur in rigid phase always in uniform time spacing.

Line $k$: The timing pulse $p_T$ which may, for example, be extracted by differentiation, and which coincides as to time with the phase rigid rear flank of $p_T'$.

Line $l$: The rectifiers Gl′ and Gl″ in the timing pulse gate B are momentarily opened (Fig. 4) by the extracted timing impulse $p_T$; capacitor $C_e$ is during this time charged to the momentary value $e$ of the square voltage $f_R$ supplied at $F_B$. The frequency of the square voltage $f_R$ delivered by the frequency divider F corresponds to the scanning or distributor frequency=8 kilocycles. The momentary value $e$, which may assume any value between the positive and negative peak amplitude of the square voltage $f_R$, depends upon the shifting $\tau$ of the zero passage of the square voltage as compared with the timing pulse $p_T$.

Line $m$: The regulation voltage 2, obtained at the timing gate B, which is conducted to the generator G.

Changes may be made within the scope and spirit of the appended claims.

We claim:

1. In a multi-channel electrical communication system in which the intelligence wave of each channel is transmitted as a series of phase-modulated electrical pulses together with timing pulses for synchronizing the receiving apparatus with the transmitting apparatus, receiving apparatus for distributing the received pulse series to the several channels and for simultaneously demodulating said pulses, comprising a timing pulse gate for the separation of the timing pulses, means for producing auxiliary pulses coupled rigidly in phase with said timing pulse and having a repitition frequency equal to the number of channels fed in parallel multiplied by the pulse repetition frequency associated with a single channel, a frequency divider, means for applying said auxiliary pulses to the input of said frequency divider, means for deriving from the output of said frequency divider a sine wave having a frequency equal to the pulse repetition frequency, a phase shifter, means for applying said sine wave to the input of said phase shifter for producing successively lagging sine waves, each allotted to a respective channel, a pulse converter, means for applying all originally received phase-modulated pulses to the input of said pulse converter for producing amplitude-modulated sawtooth waves therefrom, a demodulator for each channel, and means for feeding into each demodulator all amplitude-modulated sawtooth waves and a respective sine wave from the output of said phase shifter and said auxiliary pulses, each of said demodulators being arranged so as to be operatively effective only during the crest of the sine wave applied thereto.

2. An arrangement according to claim 1, wherein said frequency divider comprises means for producing in addition to the fundamental sine voltage, subdivided by phase shift into the various voltages, a rectangular voltage of the same frequency, and means operatively connecting said frequency divider to said pulse gate whereby the zero passages of said rectangular voltage are operative to synchronize the pulse voltage fed into said frequency divider with the timing pulse of the received pulse series.

3. An arrangement according to claim 1, wherein said frequency divider produces in addition to the fundamental sine voltage, subdivided by phase shift into the various voltages, a rectangular voltage of the same frequency, the zero passages of which are used for synchronizing the pulse voltage fed into said frequency divider with the timing pulse of the received pulse series, means for selecting the timing pulse, and means for producing a direct current voltage, the polarity and magnitude of said voltage depending upon the interval between the timing pulse and the zero passages of the rectangular voltage.

4. An arrangement according to claim 1, wherein said frequency divider produces in addition to the fundamental sine voltage, subdivided by phase shift into the various voltages, a rectangular voltage of the same frequency, the zero passages of which are used for synchronizing the pulse voltage fed into said frequency divider with the timing pulse of the received pulse series, means for selecting the timing pulse, means for producing a direct current voltage comprising a transformer, the primary winding of which receives said timing pulse, said rectangular voltage being fed to the secondary winding of said transformer through a center tap, and the ends of the secondary winding being connected to rectifier means with storage capacitor means which delivers said direct current voltage, the polarity and magnitude thereof depending upon the interval between the timing pulse and the zero passages of the rectangular voltage.

5. An arrangement according to claim 1, wherein said auxiliary pulse producing means comprises a generator operative to produce two pulses, differing in phase by 180°, of one-half the repetition frequency of the received pulse series, one of said pulses being fed into said frequency divider in order to produce the fundamental voltage for the rectangular and the sine voltages.

6. An arrangement according to claim 1, comprising a generator for producing said auxiliary pulse, said generator producing two pulses, differing in phase by 180°, of one-half the repetition frequency of the received pulse series, one of said pulses being fed into said frequency divider in order to produce the fundamental voltage for the rectangular and the sine voltages, said demodulators being subdivided into two groups, one of the two pulses differing by 180° being fed into the demodulators of one group and the other pulse being fed into those of the second group.

7. An arrangement according to claim 1, comprising a generator for producing said auxiliary pulse, said generator producing two pulses, differing in phase by 180°, of one-half the repetition frequency of the received pulse series, one of said pulses being fed into said frequency divider in order to produce the fundamental voltage for the rectangular and the sine voltages, means for connecting the two pulses differing in phase by 180° in parallel for producing a pulse necessary for the conversion of the received pulses into amplitude modulated ones, said pulse having the same repetition frequency as the received pulse series.

References Cited in the file of this patent

UNITED STATES PATENTS

| | | |
|---|---|---|
| 2,462,111 | Levy | Feb. 22, 1949 |
| 2,554,112 | Libois | May 22, 1951 |
| 2,824,908 | Palmer | Feb. 25, 1958 |